Dec. 24, 1968    R. R. BOGGS, JR., ET AL    3,418,432
REMOTE CONTROL MATRIX DICTATING SYSTEM
Filed Dec. 29, 1964    5 Sheets-Sheet 1
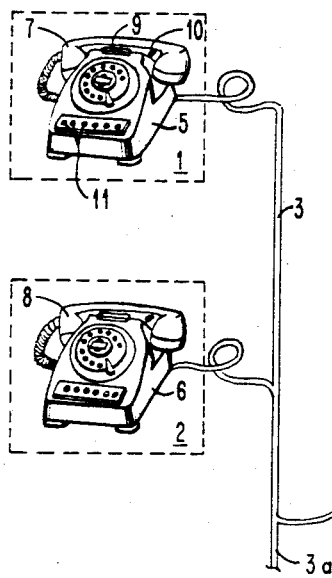
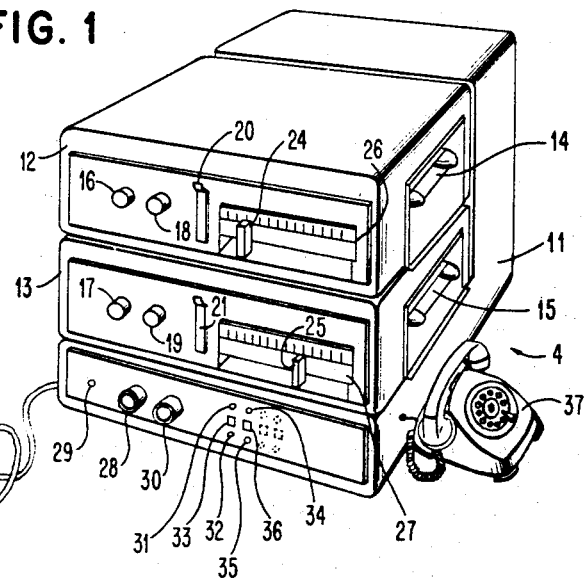
FIG. 1
FIG. 2
INVENTORS.
RAYMOND R. BOGGS, JR.
HENRY C. LOCKLAR
L. ELWOOD WEST
BY D. Kendall Cooper
ATTORNEY.

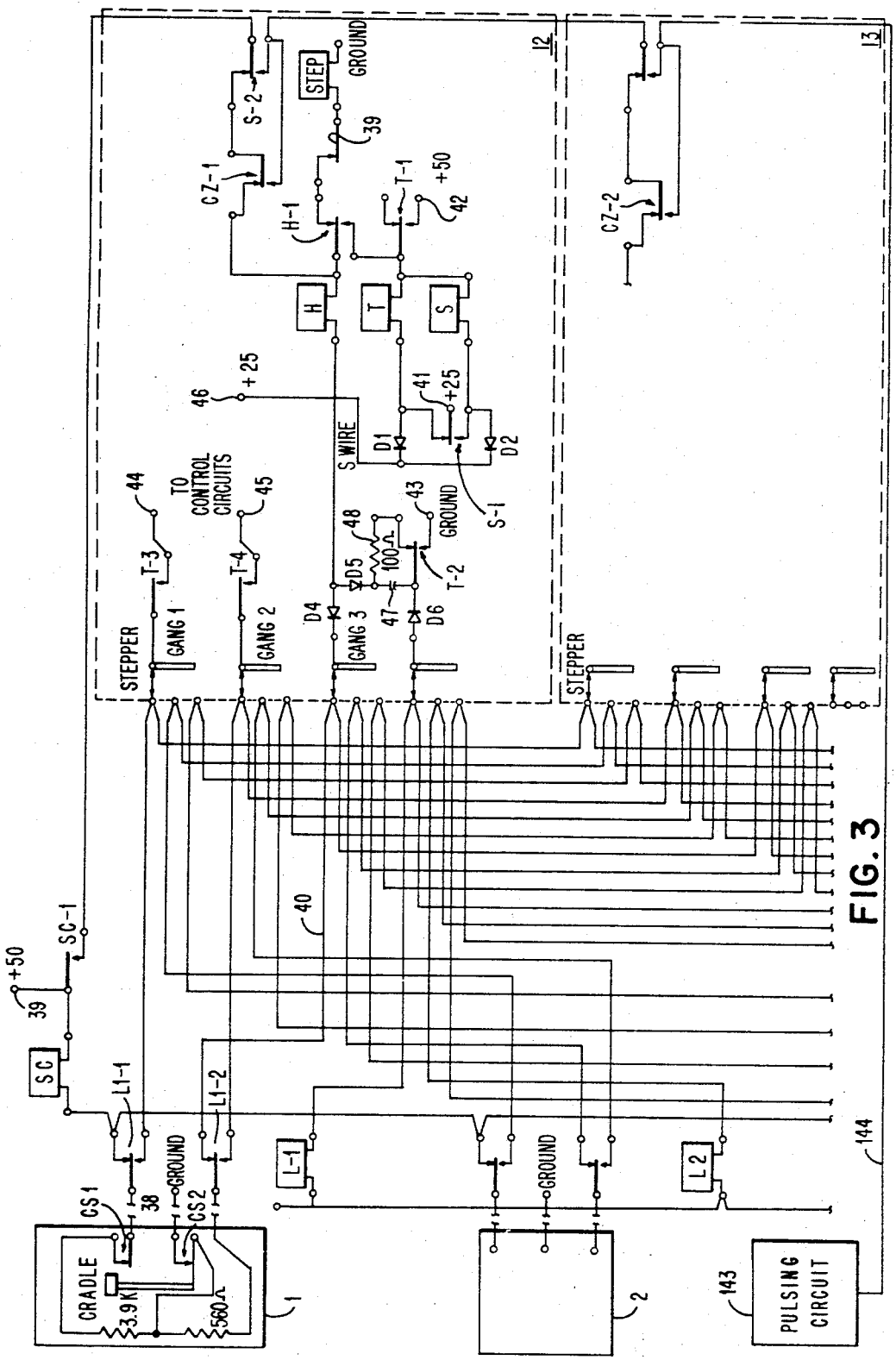

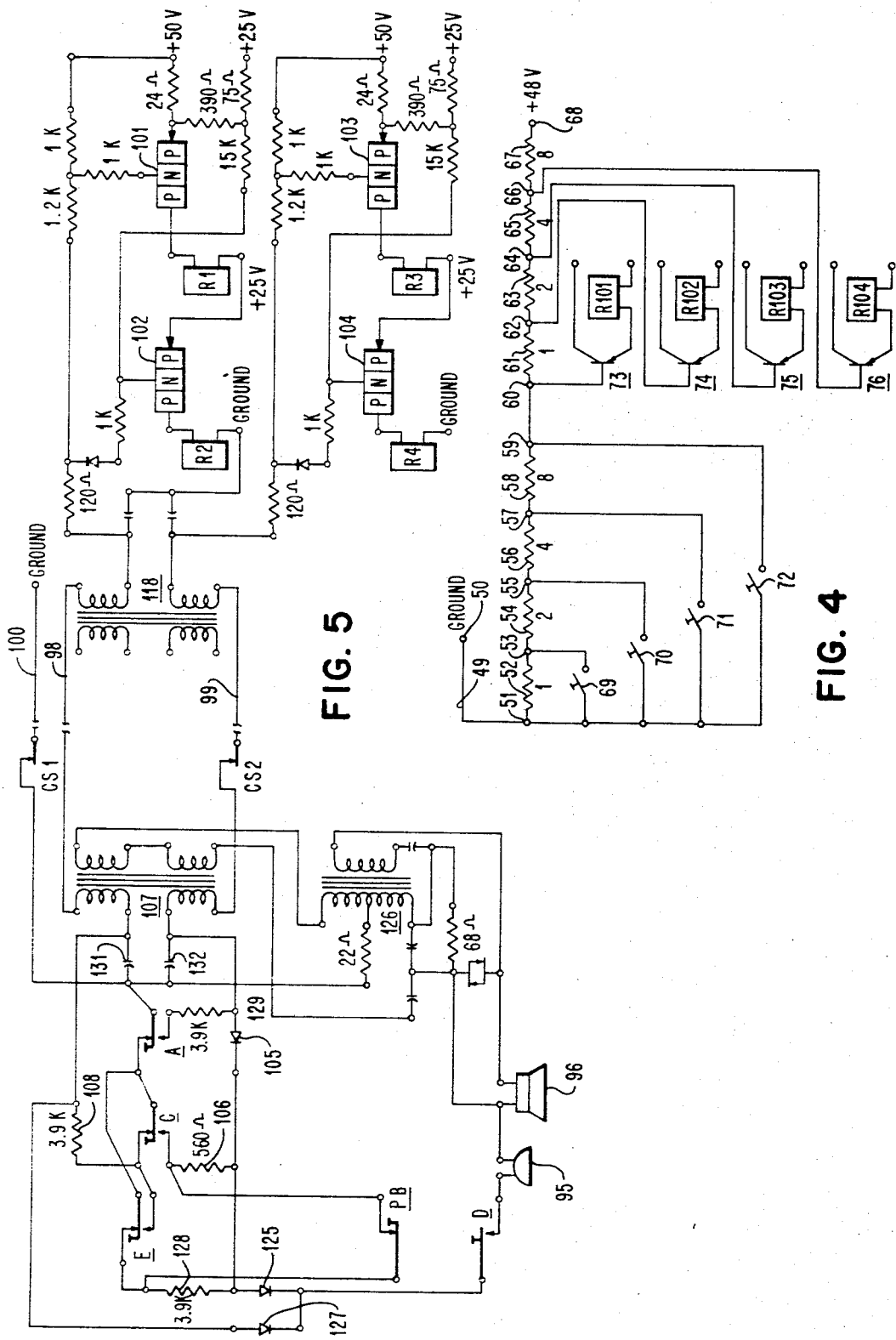

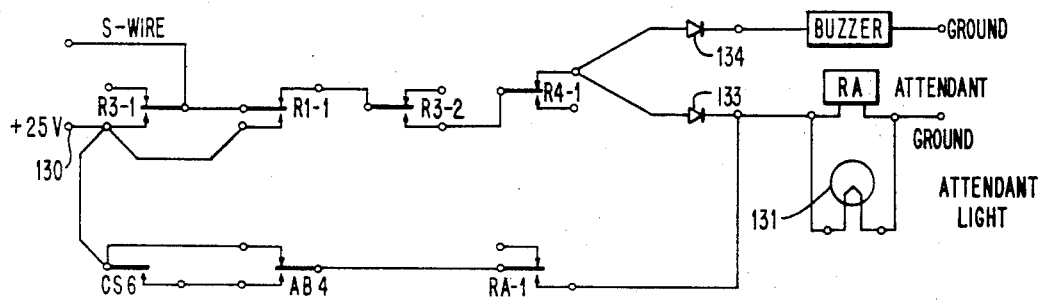
FIG. 6
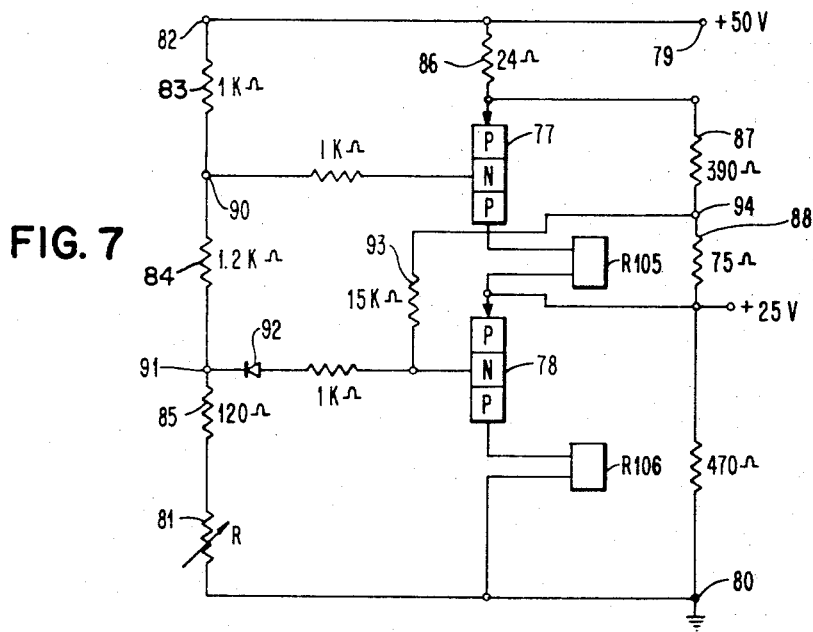
FIG. 7
|  | $\overline{R3} \cdot \overline{R4}$ | $R3 \cdot \overline{R4}$ | $R3 \cdot R4$ |
|---|---|---|---|
| $\overline{R1} \cdot \overline{R2}$ | NOT SEIZED | ATTENDANT | CORRECTION |
| $R1 \cdot \overline{R2}$ | END OF LETTER | PLAYBACK | SEIZURE |
| $R1 \cdot R2$ | ⊠ | ⊠ | DICTATE |
FIG. 8

United States Patent Office 3,418,432
Patented Dec. 24, 1968

3,418,432
REMOTE CONTROL MATRIX DICTATING SYSTEM
Raymond R. Boggs, Jr., Henry C. Locklar, and L. Elwood West, Lexington, Ky., assignors to International Business Machines Corporation, New York, N.Y., a corporation of New York
Filed Dec. 29, 1964, Ser. No. 421,928
2 Claims. (Cl. 179—100.1)

ABSTRACT OF THE DISCLOSURE

A dictating system has at least one central recorder that is available for interconnection with at least one remote dictating and control station. Once the central recorder and remote station have been connected, a large number of functional controls based on a matrix arrangement is made possible with a minimum number of interconnecting lines that also accommodate audio signals. The principle of control is $C=N^x$ wherein C represents the control conditions possible, N represents the number of active circuit conditions (number of states possible on each line with the transistor-relay combinations provided), and $x$ represents the number of interconnecting active lines, not including the ground line.

---

The invention is disclosed in connection with central recording apparatus such as that described in application Ser. No. 216,261, now U.S. Patent 3,222,460, entitled Multiple Station Selection System, inventors N. J. Albanes et al., and having the same assignee as the present application. In the Albanes et al., system, a plurality of remote microphone stations are interconnected with at least one central recorder that utilizes an endless magnetic recording belt. Like the Albanes et al., system, the system of the present invention is a private wire system, but includes modified telephone hand sets, rather than the microphone hand sets of Albanes et al.

A system of the general type noted has particular usefulness, since a number of central recording devices are made accessible to a much greater number of dictating stations with the ratio of dictating stations to recorders sometimes running as high as 100:1 or more. Normally, some provision is made for any one of the remote dictating stations to seize any one of the central recording units, as available, and once a particular central recorder is connected to a particular remote station, dictating operations such as recording and reproducing, signaling, and function control are effected as if each remote station had its own individually associated dictating unit. The central recording station also normally has a control unit for giving indications of machine conditions to an attendant, for enabling the attendant to change the record media when they have been filled with dictation, for signalling the remote stations as required and for performing other functions in the system.

Many different kinds of systems and arrangements have been proposed in the prior art for effecting seizure and function control in a system of this nature. Many attempts have been made to increase the number of functions while correspondingly reducing the number of active circuit elements required in the system. Also, attempts have been made to overcome problems encountered in systems of this type, such as undesirable loading effects of the equipment on the line which has led to erratic operations.

Accordingly, an object of the present invention is to optimize the number of functions that are available in a remotely controlled system with a minimum amount of hardware.

Another object of the invention is to provide a system of this nature that offers extreme flexibility in operation, but in which, at the same time, high standards of accuracy of operation are maintained.

A further object of the invention is to provide a system with a high degree of selectivity among the remote stations and the central apparatus, and in which the principles of the invention are applicable to any interconnection that may be established.

Still another object of the invention is to provide a dictating system that requires less current for operation and in which loading conditions are minimized.

A still further object of the invention is to provide for remote control of one apparatus by another with a reduction in the number of lines necessary to effect such control.

Another object of the invention is to provide a remotely controlled system in which a greater number of controls are exercised with a lesser number of active control elements.

In order to accomplish these and other objects of the invention, a remotely controlled dictating system is provided that has at least one central recorder for interconnection with at least one remote dictating and control station and wherein once the central recorder and remote station have been connected, a large number of controls based on a matrix arrangement is possible with a minimum number of interconnecting lines that also accommodate audio signals. The principles of the present invention may find use in a wide variety of systems in addition to dictating systems, including data transmission systems and other types of intercommunicating systems.

The foregoing and other objects, features, and advantages of the invention will be apparent from the following more particular description of the preferred embodiment of the invention as illustrated in the accompanying drawings.

In the drawings:

FIG. 1 is a diagrammatic representation of a dictating system in which the present invention is embodied.

FIG. 2 is a timing chart related to seizure operation in the system of FIG. 1.

FIG. 3 is a diagram of the seizure circuits in the system of FIG. 1.

FIG. 4 is a generalized circuit illustrating certain principles of the invention.

FIG. 5 illustrates certain line and function control circuits in the apparatus of FIG. 1.

FIG. 6 represents certain signaling circuits in the apparatus in FIG. 1.

FIG. 7 is a simplified version of certain of the circuits in FIG. 5.

FIG. 8 is a matrix chart related to the function control of the present invention.

Figure 9:
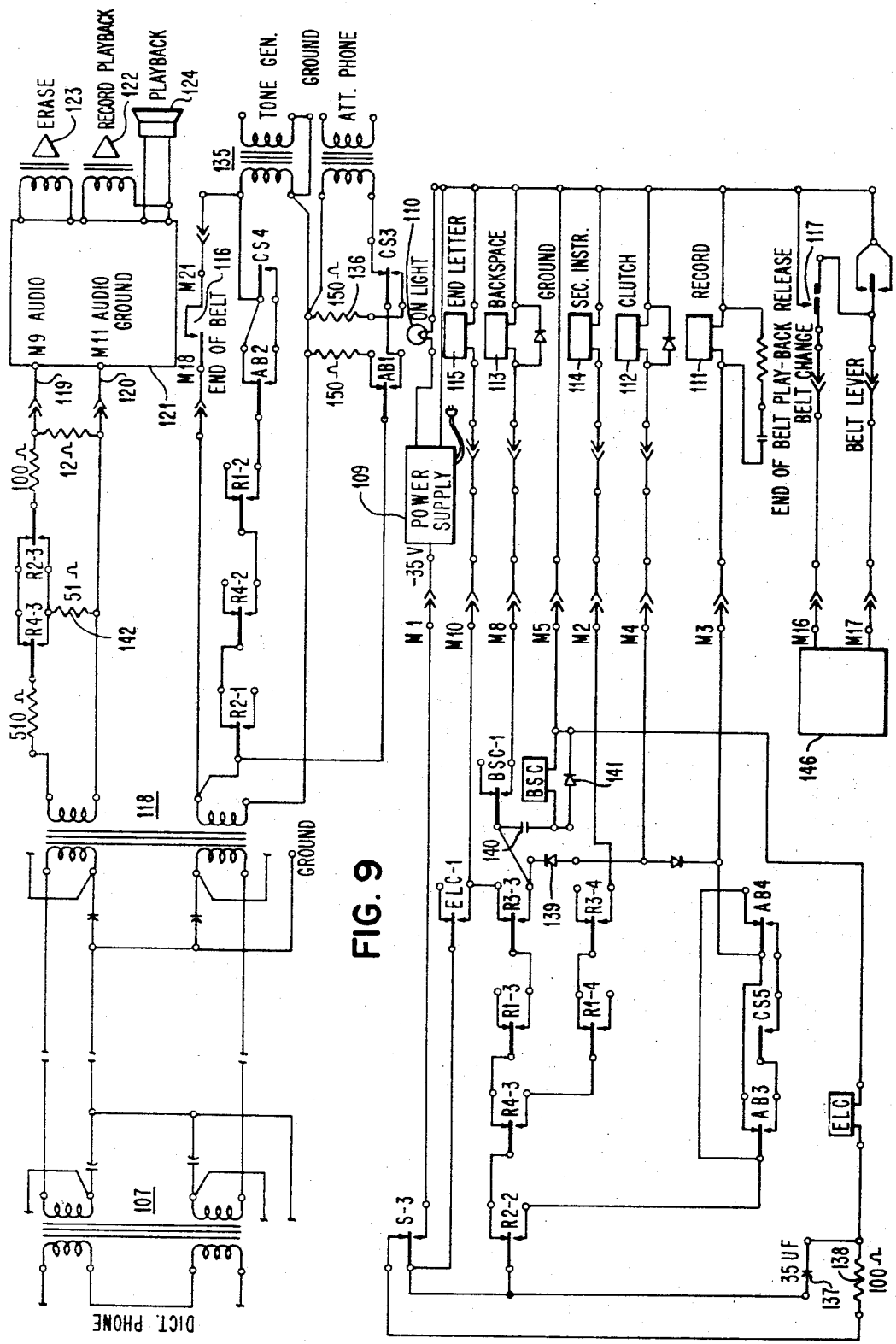
FIG. 9 illustrates a number of central recorder circuits that are used in the system of FIG. 1.

A pictorial representation of a dictating system incorporating the present invention is shown in FIG. 1. The system of FIG. 1 includes remote dictating and control stations 1 and 2 that are interconnected by means of a cable 3 to a central recording station 4. Remote stations 1 and 2 have telephone instruments 5 and 6 with respectively associated handsets 7 and 8. Other remote stations with similar telephone instruments can be accommodated by the system by connecting them to cable 3 at 3a. Considering remote station 1 as a typical example, handset 7 has a Press-to-Dictate bar 9 and a Review-Backspace button 10. A number of other buttons 11 are provided for various control functions. Remote station 2 has corresponding control elements.

Central recording station 4 includes a control unit 11 that generally has an L-shaped configuration. Resting on control unit 11 are magnetic recording machines 12 and 13 that are comparable to those disclosed in the aforementioned Albanes et al., application. Each machine records on a magnetic belt record medium, such as magnetic belts 14 and 15. Machines 12 and 13 are similarly equipped and have volume control knobs 16 and 17, tracking (tuning) knobs 18 and 19 for establishing proper tracking of a recorded signal, and belt release levers 20 and 21 which are pulled forward to load or unload the belts as required.

Recording or reproduction of signals is effected by rotating the belt, such as belt 14, while concurrently moving a magnetic head unit transversely adjacent the belt thereby tracing a helical path on the belt. As the magnetic recording head moves from the beginning to the end of the belt which is from left to right in FIG. 1, an attached index assembly, such as assemblies 24 and 25, serve to indicate the relative position of the magnetic head with respect to the belt. Associated with the index assemblies 24 and 25 are index slips 26 and 27 on which marks or perforations can be made to indicate End of Letter or Secretary instructions.

Control unit 11 includes an On-Off knob 28 and a Power-on lamp 29. A buzzer control knob 30 is also provided. Arranged to the right of knob 30 on control unit 11 is an array of lamps and buttons that are associated with the individual recording machines 12 and 13. For purposes of discussion, it may be assumed that lamps 31 and 32 and button 33 are associated with machine 12 while lamps 34 and 35 and button 36 are associated with machine 13. Additional lamps and buttons, shown in phantom, are provided for use with additional recording machines that may be accommodated, but that are not shown in FIG. 1.

Control unit 11 extends from front to rear and then at a substantially right angle in a vertical direction adjacent the rear portions of machines 12 and 13. This facilitates connecting machines 12 and 13 into the power source and also provides additional room for certain stepping switches and relay elements required during system operation. Additional recording units, such as machines 12 and 13, can be accommodated by extending control unit 11 upwards sufficiently to encompass the rear portions of such machines and by providing additional stepping switches and other elements necessary. Control unit 11 also has an attendant telephone instrument 37 by means of which the attendant can converse with dictators at the remote stations 1 and 2. The system disclosed is a private wire system, but provision may also be made, if desired, for dial-type operations.

FIG. 2 shows the timing involved in operation of the seizure circuit of FIG. 3. In order to explain the seizure operation, it will be assumed that both of the remote stations 1 and 2 are inactive and therefore that the central recording devices 12 and 13 are inactive. In FIG. 3, remote station 1 has two cradle switches designated CS1 and CS2. Switches CS1 and CS2 are closed whenever handset 7 is removed from the cradle of telephone instrument 5. Also shown in the circuitry associated with remote station 1 are two resistors which, in a typical instance, have values of 3.9K ohms and 560 ohms. Assuming that the handset 7 has been removed from the cradle, both switches CS1 and CS2 will be closed. An electrical path will then exist from ground at terminal 38 through switch CS2, through the 3.9K ohm resistor, through switch CS1, and over the line through normally closed L1-1 points and to the Seizure Control relay SC to a potential at terminal 39, which for explanatory purposes is considered to be +50 volts.

The Seizure Control relay SC has an associated normally open point SC-1. This now closes and supplies +50 volts through an S-2 point to other circuitry that in the present instance is associated with central recorder 12. Central recorder 12 includes a stepper mechanism that is operated under control of a Step magnet. Central recorder 12 also has certain relays designated H, T, and S. While not shown, it will be understood that central recorder 13 has comparable circuits and circuit components. The +50 volt potential through relay contact S-2 is directed through a normally closed relay point H-1 to the Step magnet. Whenever the stepper is not situated at a point that corresponds to the remote station that is attempting to gain access to this particular recorder, the Step magnet will be activated to increment the stepper along to find the proper connection with the remote station. The Step magnet has an associated interrupter switch designated 39 that supplies voltage to the Step magnet whenever it is closed.

When the stepper mechanism reaches the line that is attemtping to gain access, relay H will become energized. Since it is assumed that the remote stations and the central recorders were inactive up to the present time, it will be noted that the stepper in the circuits associated with recorder 12 is presently sitting at the proper position in order to connect remote station 1 to the recorder 12. Therefore, in the assumed instance, relay H will be energized immediately upon the energization of the Seizure Control relay by the following path. The path leads from the +50 volt potential at relay contacts S-2, contacts CZ-1, through relay coil H, through the diode D4, through the third gang of the stepper switch, by line 40 to the normally closed L1-2 point, through the 560-ohm resistor in remote station 1 and the switch CS2 to ground at terminal 38. When relay H picks, its normally closed H-1 point transfers thereby opening the circuit to the Step magnet. In the assumed instance this occurs before the stepper has a chance to operate. The transfer of relay contact H-1 completes a circuit for +50 volts to the T relay. The T relay is connected through the normally closed S-1 points to +25 volts at terminal 41. When the T relay energizes, it holds through its own T-1 point to +50 volts at terminal 42. Also, the T-2 contacts transfer to enable the picking of the L1 relay from ground at terminal 43. As soon as the L1 relay is energized, its associated L1-1 and L1-2 points transfer.

With the transfer of the L1-1 and L1-2 points, the telephone station 1 will be connected through gang 1 and gang 2 of the stepper switch to the control circuits of recorder 12 by terminals 44 and 45. Seizure of recorder 12 in the manner just described results in relays R1, R3 and R4, FIG. 5, being energized as will be more fully described in connection with the matrix chart of FIG. 8. When relay R3 is energized, its R3-1 point transfers, FIG. 6 and supplies +25 volts from terminal 130 to the S wire and by way of terminal 46, FIG. 3, to the seizure circuits.

As soon as +25 volts is made available from terminal 46, relay S picks through diode D2 and by way of relay contact T-1 to terminal 42. Relay S holds through its own S-1 point from terminal 41. Ordinarily, this would break the hold circuit for relay T, but relay T is held through diode D1 to terminal 46. The picking of relay S also transfers the S-2 point in recorder 12 and transfers the action of seizure control relay SC to the corresponding contacts in recorder 13.

Referring to FIG. 2, it will be seen that the H relay has a delayed drop following the energization of the L1 relay. This is provided by capacitor 47. If capacitor 47 were not in the circuit, the H relay would drop and with relay S not picked, the Step magnet would have voltage impressed across it and there would be a possibility of the Step magnet and associated stepper switch stepping one place. Capacitor 47 is initially discharged through the 100 ohm resistor 48 and begins to charge when the T-2 point transfers to be connected to terminal 43. With this arrangement, therefore, relay H does not drop out until relay S picks. A number of diodes are provided in the circuit associated with recorder 12. Diode D4 prevents a back circuit through one machine from picking an H relay in another machine. Diode D5 blocks the L relay from being picked when the H relay is picked.

Diode D6 insures that the H relay is not picked by the L relay or the T-2 point of another machine.

In order to illustrate a typical complete cycle involving seizure, it will be assumed that the dictator at remote station 1 is finished with his dictation and places the handset 7 back on the cradle of telephone instrument 5, FIG. 1. This results in the opening of the switches CS1 and CS2 and removes potential to the control circuits on lines 44 and 45. As soon as this happens, the +25 volts from terminal 46 is removed due to relay R3 becoming de-energized and relay point R3-1, FIG. 6, transferring back to normal. The dropping of the T relay opens the hold circuit for both the S and T relays to terminal 42. The S-1 point closes but since the T-1 point is now back to a normally closed condition, the T relay does not pick. Therefore, the machine 12 seizure circuits have been restored to normal with the S-2 point in its normally closed condition and the next time that a seizure control signal is applied these seizure procedures will again take place. At this time then recorder 12 would become available to any remote station that requires a recorder.

A similar seizure action takes place with any other remote station such as remote station 2 in relation to any of the central recorders 12 or 13.

As soon as one of the remote stations 1 or 2 is connected through the seizure circuits to one of the central recorders 12 or 13, the interconnecting circuits are effective to transmit voice signals in either direction and also to effect control of functions of the central recorder by the remote station.

Various signal transmissions and control circuits are shown in FIGS. 5, 6, 7, 8, and 9. FIG. 4 is a generalized version of the function control according to the present invention, while FIG. 5 is a simplified circuit schematic of the line and function control used in the system of FIG. 1. FIG. 6 illustrates certain signalling circuits while FIG. 7 is a representation of a basic circuit that is expanded in the circuit of FIG. 5. FIG. 8 is a matrix arrangement illustrating how a multiplicity of functions may be accomplished under control of a minimum number of control elements at the central recorder and using a minimum number of control elements at the central recorder and using a minimum number of transmission lines. FIG. 9 shows the machine control circuits in considerable detail.

FIG. 4 illustrates a two-wire system in which a plurality of functions is enabled under control of a plurality of switches at a remote station. FIG. 4 includes a first line 49 extending from a ground terminal 50, and through a series of terminals and resistors designated 51 through 67 to a +48 volt terminal 68. The resistances 52, 54, 56, and 58 as well as the resistances 61, 63, 65, and 67 are maintained in a 1-2-4-8 relationship as far as relative values are concerned. With the network shown, it is possible to control the energization of four relays designated R101 through R104 under control of switches designated 69, 70, 71, and 72. Relays R101 through R104 have PNP transistors associated with them respectively designated 73, 74, 75, and 76. Terminal points 60, 62, 64, and 66 are connected respectively to the bases of transistors 73, 74, 75, and 76. This maintains the transistors with the bases somewhat positive in relation to the emitters as long as switches 69-72 remain open.

Closure of switch 69, as an example, shunts out resistor 52 and thereby leaves only 14 units of resistance in the left branch of the circuit of FIG. 4. The right branch of the circuit including resistors 61, 63, 65, and 67 still has 15 units of resistance and the closure of 69 therefore results in terminal 60 becoming negative. This enables the transistor 73 to conduct thereby energizing the associated relay R101. The energization of relay R101 can then be used to control a machine function.

Closure of switch 70, as another example, results in shunting of resistors 52 and 54 and the reduction of the units of resistance in the left branch of the circuit of FIG. 4 to twelve units. This, combined with one unit of resistance in resistor 61, results in thirteen units of resistance to the left of terminal 62 and 14 units of resistence to the right of terminal 62. Therefore, terminal 62 becomes negative and this results in the conduction of transistor 74 and the energization of its associated relay R102. Ordinarily, certain contacts of relay R102 would be in series with the circuit controlled by relay R101 so that when relay R102 becomes energized, relay R101 becomes ineffective.

Closure of switch 71 results in eleven units of resistance to the left of terminal 64 and twelve units to the right of terminal 64. This then establishes a negative condition at terminal 64 to switch on transistor 75 and energize relay R103.

The scheme of FIG. 4 can be expanded so long as the relative proportions of resistance are maintained. The next units of resistance if added, would be 16, 32, 64, 128, and so on.

The generalized version of the circuit in FIG. 4 lends itself readily to an expanded matrix version of a control circuit shown in FIG. 5 and diagrammatically represented in FIG. 8. The expansion of the circuit of FIG. 4 into a matrix form utilizes a basic circuit in FIG. 7 which will be discussed prior to discussion of the circuit of FIG. 5. The circuit of FIG. 7 has two transistors designated 77 and 78 and respectively associated relays R105 and R106. An assorted number of resistors and diodes with a +50 volt potential at terminal 79 and ground at terminal 80 complete the circuit of FIG. 7. With the circuit arrangement shown, the emitter of transistor 77 is practically at +50 volts while the emitter of transistor 78 is about +25 volts. A variable resistor 81, representing a resistor at the remote station end of the line is included for control purposes. If the resistance of resistor 81 is infinite, no current flows through the line from terminal 82 to terminal 80 through resistors 83, 84, and 85, except $I_{co}$ currents from transistors 77 and 78.

Under these conditions, transistor 77, due to the presence of the resistor 86 and the circuit including resistors 87 and 88 to +25 volts at terminal 89, has a voltage at its emitter that is somewhat more negative than the +50 volts. In order to turn on transistor 77, it is necessary that the terminal 90 become somewhat negative with respect to +50 volts and therefore the $I_{co}$ of transistor 77 is insufficient to place transistor 77 into conduction.

The emitter of transistor 78 is about +25 volts but due to the fact that there is no current presently flowing through the line, the potential at terminal 91 will be almost +50 volts. Under these circumstances, the diode 92 is not conducting and due to the bypass path of resistor 93 back to junction 94, transistor 78 will be cut off also.

Therefore, with a high resistance of variable resistor 81, neither transistor 77 nor 78 is conducting and neither of the associated relays R106 and R107 is energized.

If the value of variable resistor 81 is reduced to a certain finite value, the potential at terminal 90 will change sufficiently to place transistor 77 into conduction, thereby energizing relay R105. Also, if the resistance of variable resistor 81 is reduced to an even greater extent, the conduction of transistor 78 is assured. When transistor 78 is switched on, relay R106 also becomes energized. This occurs as follows. With the circuit relationship shown, a reduction of the value of variable resistor 81 will continue to insure that the voltage at terminal 91 is lower than that at junction 94 between resistors 87 and 88 and transistor 77 will eventually be placed in conduction to energize relay R105.

Continued reduction of the resistance of variable resistor 81 results in reaching a value at terminal 91 in relation to terminal 94 that effects the switching on of transistor 78 in addition to transistor 77. Under these circumstances both relay R105 and R106 will be energized. Variable resistor 81 can be reduced even further beyond this point without much effect on the circuit.

From the foregoing discussion, it is evident that the circuit of FIG. 7 becomes essentially a three-state circuit. The first state is when neither transistor nor relay is energized, the second state is when transistor 77 and relay R105 are energized, and the third state is when both transistors 77 and 78 and associated relays R105 and R106 are energized. As an example of the values of variable resistor 81 that may apply, the first state will be established with an infinite resistance of resistor 81. The second state, with relay R105 energized, occurs when variable resistor 81 is reduced to a value of 3.9 kilohm, and the third state with both relays R105 and R106 energized, occurs when the resistance of variable resistor 81 is reduced to about 560 ohms.

In FIG. 5, two of the basic circuits of FIG. 7 are combined to provide a matrix type of control as illustrated in FIG. 8. Certain circuitry associated with a remote dictation station, such as station 1 is located generally to the left in FIG. 5 and other control circuitry associated with the central recorder, such as recorder 12, is shown to the right in FIG. 5. Certain of the values of the resistors included in the circuit in FIG. 5 will be recognized as corresponding to those given in connection with the basic control circuit of FIG. 7. Of particular interest are the resistive values of 560 ohms and 3.9 kilohms.

The remote station has a microphone transmitter designated 95 and a speaker 96. In addition, the remote dictating station has certain control switches designated as follows:

D—Dictate
PB—Playback
E—End of Letter
C—Correction
A—Attendant

Switches other than those indicated may be provided for control by the dictator at the remote station but those given will suffice for explanation of the present invention.

It will be recalled that the circuit of FIG. 4 was a two-wire circuit. The circuit of FIG. 5 is a three-wire circuit with a common ground wire 100 serving two combined audio-control wires 98 and 99.

A repeater transformer 107 acts as a center tap transformer with the two outer wires being connected to the two control wires. Capacitors 131 and 132 are audio bypass capacitors. Therefore, the points to the left of the repeater transformer 107 are shorted audio-wise to ground. One winding of repeater transformer 107 connects back to an anti-side tone coil 126, then back to the handset of the telephone. The anti-side tone coil 126 is to eliminate the sound which is being spoken from returning back through the receiver, to the dictator. On the central recorder end of the line, another repeater transformer 118 is used with one winding going to the audio circuits of the dictating machine.

Associated with central recorder 12 and incorporated in control unit 11 for translating line conditions into control impulses are four transistors 101, 102, 103, and 104 with respectively associated relays R1, R2, R3, and R4. The circuit has connections to +50 volts, +25 volts, and ground.

Applying the principles that were discussed in connection with FIG. 7 to the circuit of FIG. 5, the circuit portion involving relays R1 and R2 can be considered to have three states, namely, both relays de-energized, one relay energized, and two relays energized. The circuit portion comprising relays R3 and R4 can also be considered to have three states, that is, both relays de-energized, one relay energized, and both relays energized.

The three possible states of relays R1 and R2 are combined with the three possible states of relays R3 and R4 to give the matrix function arrangement shown in FIG. 8. The three states of relays R1 and R2 are indicated vertically to the left of the matrix while the three states of relays R3 and R4 are indicated horizontally at the top of the matrix. In the system under discussion, seven (7) possible combinations of relays R1, R2, R3, and R4 are used for status or control purposes. Two of the possible nine states are not used but could be arranged for use if desired.

The principle of control is expressed simply as $C=N^x$, wherein C represents the control conditions possible, wherein N represents the number of active circuit conditions (number of states possible on each line with the transistor-relay combinations provided, and wherein x represents the number of interconnecting active lines, not including ground line 100. The number of states is one more than the number of transistor-relay combinations provided. In the arrangement of FIG. 5, control conditions possible are resolved as:

$$C=N^x$$
$$C=3^2$$
$$C=9$$

If four transistor-relay states are established (as would be possible with three transistor-relay combinations on each line) and three lines not including the ground line, the system becomes:

$$C=N^x$$
$$C=4^3$$
$$C=64$$

As another example, four states and four lines lead to:

$$C=N^x$$
$$C=4^4$$
$$C=256$$

Therefore, the basic principles disclosed herein can be expanded to accommodate as many control or signalling or data transmitting or handling situations as may be required in the system.

During operation, the audio signals pass over the wires 98 and 99. Certain of the control potentials are exerted by varying the resistances between audio wire 98 and ground wire 100 or between audio wire 99 and ground wire 100.

All of the control buttons and switches at the remote station designated D, PB, E, C, and A are of the make before break type.

Considering the case when none of the control buttons at the remote station have been transferred, a seizure status will be effective in the following manner. A circuit is established over wire 99 through diode 105, through the 560 ohm resistor, through the Playback button PB and the End of Letter button E, the Attendant button A, and to ground by line 100. The insertion of the 560 ohm resistor 106 in the series circuit just described results in the energization of both relays R3 and R4. Considering another portion of the control circuit, a circuit exists from line 98 through a winding of the repeater transformer 107, through the 3.9 kilohm resistor 108, through the Correction button C and the Attendant button A to ground on line 100. This circuit enables relay R1 to be energized. Referring to the matrix chart of FIG. 8 it will be seen that the conditions with R1 energized, R2 de-energized, R3 energized, and R4 energized correspond to a seizure condition of the system.

The nine possible states of relays R1, R2, R3, and R4, seven of which are used in the embodiment disclosed herein, are reflected by various combinations of relay points in FIGS. 6 and 9 that are associated with relays R1–R4. The control circuits shown in FIG. 5 can be considered as primary control circuits while those shown in FIGS. 6 and 9 involving the R1–R4 relay contacts can be considered as secondary control circuits. Shown in FIGS. 6 and 9 are a number of functional magnets and solenoids having to do with control of the recorder and involving various signaling functions required in the system. The items of interest in FIG. 6 are:

Buzzer
Attendant relay
Attendant light

The major items of interest in FIG. 9 are as follows:

End of Belt Warning Contacts
On Light
End of Letter Solenoid
Backspace Magnet
Secretary Instruction Solenoid
Clutch Magnet
Record Relay
End of Belt Playback Release Contacts and Belt Change Contacts
Belt Lever Contacts Power is supplied to the central recorder from a power supply 109 that is indicated as being on by energization of the On Light 110.

It is assumed that a magnetic recording belt is in the proper position in the central recorder and that power is on. Under the circumstances, in order to effect recording of dictated material, it is necessary to energize the Record relay 111 and the Clutch magnet 112. Playback of previously dictated material is effected under control of the button 10 on handset 7 at the remote station 1, FIG. 1. When button 10 is depressed, the primary and secondary control circuits are energized in such a manner that the Backspace magnet 113 is energized in order to backspace the magnetic recording head in relation to the magnetic belt. Following the momentary energization of the backspace magnet 113, the clutch 112 is energized to drive the belt and head in order to pick up previously recorded signals. During playback, the Record relay 111 is de-energized. Perforations or marks on the index slip 26, FIG. 1, are effected by energizing either the Secretary instruction solenoid 114 or the end of letter solenoid 115. An End of belt warning signal is supplied to the dictator near the end of the belt to inform him that he just has a small amount of space remaining on the belt by closure of end-of-belt warning contacts 116. When the actual end of belt is reached, the belt change contacts 117 are closed to supply an appropriate signal to the dictator and attendant to indicate this condition.

Referring again to FIG. 9, audio signals are supplied through the repeater transformers 107 and 118 and by wires 119 and 120 to the amplifier circuits 121. After amplification, the signals are supplied to record-playback winding 122 for recording. Prior to recording, the belt is erased by signals from erase winding 123. Signals detected during playback are supplied to the amplifier 121 and by lines 119 and 120, repeaters 118 and 107, back to the speaker 96 at the remote station, FIG. 5. A local speaker 124, FIG. 9, is also supplied at the central recorder.

In order to effect all of the functions required in the system with a minimum number of lines which in this case is 3, the primary control circuit of FIG. 5 operates in the following manner.

The Dictate function is established by depression of the dictate bar D. A circuit then exists from line 99, through diode 105, and diode 125 to the transmitter 95. The circuit then continues through the anti-side tone coils 126 and to ground by way of line 100. Another path exists by way of line 98 through the repeater transformer 107 and diode 127 and also through the transmitter microphone 95 to ground by way of line 100. In this manner, a low resistance to ground is provided on both sides and therefore all the relays R1, R2, R3, and R4 at the central recorder will be energized and also enough current is provided to operate the transmitter microphone 95. FIG. 8 shows that the energization of relays R1, R2, R3, and R4 at the same time establish a Dictate mode in the system. The actual energization of the proper circuit elements including Record relay 111 and Clutch magnet 112 in FIG. 9 occurs through operation of the secondary relay contact circuits shown in FIG. 9.

In order to establish a Playback mode of operation, the Playback button PB is depressed. A circuit then exists along wire 99, through repeater transformer 107, through diode 105, through the 3.9 kilohm resistor 128, through the End of letter contact E, through the Attendant contact A, and to ground by line 100. Another path exists from wire 98 through the 3.9 kilohm resistor 108, through the Correction button contact C, through the Attendant contact A, and by line 100 to ground. With these resistances in the circuit at the remote station, relays R1 and R3 are energized and relays R2 and R4 are de-energized to establish the Playback mode, FIG. 8.

In order to establish an End of letter operation, the End of letter button E is depressed. This closes the End of letter contact and establishes a circuit from line 98 through the repeater transformer 107, through the 3.9 kilohm resistor 108, through the End of letter contact E, through the Attendant contact A, and to ground by line 100. This results in the energization of relay R1 only, to establish the End of letter operation.

If it is desired to operate the Secretary instruction solenoid 114 at the central station in order to give a correction indication on the index slip 26 on recorder 12, FIG. 1, the Correction button C, FIG. 5, is depressed. A path then exists over line 99 through the repeater transformer 107, through diode 105, through the 560 ohm resistor, through the Correction contact C, now closed, through the Attendant contact A, and to ground by line 100. From line 98, there is no path to the ground line 100 at this time. Therefore, relays R3 and R4 will be energized to establish operation of the Secretary instruction solenoid 114.

Provision is made for signalling the attendant at the central recording station by depression of the Attendant button A. The path established for line 99 passes through repeater transformer 107, through the 3.9 kilohm resistor 129, through the attendant contact A, and to ground by line 100. There is no path from wire 98, so at this time the only relay energized is relay R3 which, through the secondary circuits in FIGS. 6 and 9, effects signalling of the attendant.

The contacts of relays R1–R4 that are selectively energized in the manner just described are arranged in a secondary logic portion of the circuit of the central recorder that is more particularly shown in FIGS. 6 and 9. Certain portions of this circuitry have already been discussed in a general way, but more specifically, the circuitry includes a first portion concerned with remote system controls, a second portion concerning the dictating machine controls, and a third portion concerning the audio controls.

The first portion of the secondary logic serves two major functions. These are: (1) to furnish the voltage to the S wire, FIGS. 3 and 6, and (2) to provide the voltage for the attendant latch relay shown in FIG. 6. As previously indicated, whenever the relay R1 or relay R3 is energized, +25 volts is available to the S wire. When relay R3 is energized, relay R1 not energized, and relay R4 energized, +25 volts is supplied through diode 133, FIG. 6 to energize the Attendant relay. This is done by the dictator depressing one of the buttons 11 on telephone instrument 5 at remote station 1, FIG. 1. This will also result in energization of the buzzer through diode 134, FIG. 6. The attendant buzzer will buzz as long as the particular button 11 is depressed. A lamp 131, FIG. 6 is also lighted whenever the Attendant relay RA is energized. Energization of lamp 131 notifies the attendant to lift the handset associated with telephone instrument 37, FIG. 1. When this is done, circuitry is provided to disable the dictation circuits for the dictator. The RA relay is dropped and the dictator will be able to hear whatever the attendant says into the telephone 37. If the dictator wishes to talk to the attendant, he may do so by depressing dictate bar 9, FIG. 1. When the attendant places the handset back on the telephone 37, the circuit is restored to normal. The attendant is coupled into the system by means of a repeater transformer 135 FIG. 9. A 150 ohm resistor 136 is associated with transformer 135 and is shunted across the lower secondary winding of transformer 135 if the attendant button AB1 has not been depressed, and if the cradle switch CS3 is closed. Therefore, the repeater transformer 135 works into a 150 ohm impedance. The upper secondary winding of the repeater coil associated with transformer 135 has a relatively high impedance and in the arrangement shown this serves as a coupling circuit with a fairly constant current. This makes it possible, for example, for both the attendant and dictator to review previously dictated material at the same time.

Normally, once the dictator at a remote station has seized a central recorder, a seizure tone is supplied to the dictator to inform him that he does have a proper connection and can proceed with dictation or control of the central recorder. During operation of the attendant circuits, certain provision is made in the circuitry of FIG. 9 including the points of AB2 and CS4 to disconnect the seizure tone from the circuit to the remote station.

The secondary logic control circuits of particular interest in the system are under control of relays R1–R4, also. Provision is made upon seizure to supply an End of letter indication on the index slip 26. When recorder 12 is not seized, the S–3 contact FIG. 9, will be in its normally closed position. This permits the capacitor 137 to be discharged through the normally closed point S and through the 100 ohm resistor 138. When relay S, FIG. 3 is energized, the S–1 point transfers and the —35 volt supply from the power supply 109 is then applied to charge capacitor 137. However, capacitor 137 cannot charge instantaneously and, therefore, a —35 volt potential is impressed across the ELC relay which is the End of letter control relay. This relay is a high impedance relay and will be energized due to the fact that capacitor 137 cannot charge immediately. When the ELC relay picks, the ELC–1 points transfer and supply a —35 volt potential to energize the End of letter solenoid 115, FIG. 9. This effects marking of the slip 26 in recorder 12, FIG. 1. The solenoid 115 can also be energized from the —35 volt potential supplied by power supply 109 through various relay contacts including contacts R2–2, R4–3, R1–3, and R3–3 when relay R1 is energized as a result of depression of the End of letter button at the remote station.

When the Playback button is depressed at the remote station, relays R1 and R3, FIG. 5, are energized, and result in the picking of the clutch magnet 112 through diode 139, the R3–3 point now transferred, the R1–3 points now transferred, the R4–3 points, normal, the R2–2 points, normal, and by way of S–3 to the —35 volt supply.

Also, whenever the Playback button is depressed at the remote station, the capacitor 140 will be in a discharged condition and —35 volts will be supplied to the Backspace magnet 113, FIG. 9. This will operate to effect a backspacing of the magnetic head in the central recorder 12. At other times when the Playback button is not depressed, capacitor 140 is discharged through diode 139, through the clutch 112 to ground and then by way of diode 141 back to the capacitor 140.

The circuit for operating the Secretary instruction solenoid 114 passes through the R2–2 point from —35 volts, the R4–3 points, transferred, the R1–4 points, and the R3–4 points, transferred, to energize the solenoid 114.

In order to establish a Dictate mode, all relays R1–R4 are energized, as shown in FIG. 8. This results in the transfer of the R2–2 points, FIG. 9, and a path is then established to energize the Record relay 111 and to energize the clutch magnet 112.

The audio portion of the secondary logic has four functions: (1) to couple the signal from the line to the dictating machine during the Dictation mode, (2) to couple the signal coming from the dictating machine to the line during Playback mode. (3) to couple supervisory signals into the audio system, and (4) to couple the attendant phone into the audio system whenever required.

Referring to FIG. 9, the audio circuitry includes the transformers 107 and 118. Transformer 118 has two secondary windings on the recorder side of the line. The double winding secondary serves to isolate the ground of each dictating recorder from all other recorders and from the system ground. The secondary winding serving the audio path includes an R4–3 contact and an R2–3 contact in series. The R2 and R4 relays are picked during a Dictate mode, and a path is then provided from the secondary of transformer 118 to the audio input of the central recorder 12 by lines 119 and 120. The path at this time has more attenuation due to the fact that the 51 ohm resistor 142 is inserted as a shunt resistance.

During a Playback mode, relays R2 and R4 are not energized and the resistor 142 is then not in the audio transmission path from the amplifiers 121.

As a matter of additional interest, during a Seizure mode, relay R4 is energized, and relay R2 is not energized. Therefore, at this time no continuous path is supplied for signals since the R4–3 and the R2–3 contacts will maintain the path open. This insures that the seizure tone supplied through transformer 135, FIG. 9, is not recorded on the magnetic recording media. When the system returns from the Dictate mode to the Seizure mode, the seizure tone appears before the central recorder drops out of the Dictate mode. Therefore, the seizure tone could be recorded, if it were not for the R4–3 and R2–3 contacts.

A number of supervisory signals are supplied in the system. These are:

(1) Busy Tone Signal
(2) Seizure Tone
(3) End of Belt Warning to the Dictator
(4) End of Belt Warning to the Attendant
(5) Attendant Buzzer and Lamp If all of the central recorders are busy at the central station, it is desirable to notify any remote dictator that this is the case, and therefore a pulsing circuit 143, FIG. 3 is provided to supply a tone signal to the line. It will be recalled in discussions of the seizure circuits that as each central recorder becomes busy, an S–2 point, such as the S–2 point in recorder 12, FIG. 3, transfers the seizure control to the next recorder, such as recorder 13. If recorder 13 happens to be the last recorder in the relay chain, any attempt to seize control of a recorder at the central station will result in activation of the pulsing circuit 143 by way of line 144. The pulsing signal will be supplied to any telephone attempting to seize a recorder, except those that have already been connected to a recorder.

The seizure tone circuitry for notifying a dictator that he has gained access to a central recorder is shown in FIG. 9. A tone generating winding is associated with transformer 135 to supply a signal to the dictator when he is connected to the central recorder and it is in a standby seizure mode. Any time any of the function or control buttons is depressed by the dictator, the seizure tone is removed by transfer of relay contacts such as contacts R2–1, R4–2, and so on, FIG. 9.

An end of belt warning is given to the dictator by closure of contacts 116, FIG. 9, which serves to couple the signal generated through transformer 135 directly to the line to inform the dictator that the end of belt has been reached.

If desired, provision can also be made for indicating when a dictator has dictated into an end portion of the recording belt which is insufficient to accommodate a typical dictating interval such as four minutes. When this happens certain circuitry indicated in FIG. 9 at 146 is effective to energize a CZ relay at any dictating machine in which this condition prevails. As shown in FIG. 3 the CZ contacts such as CZ-1 can be inserted in the seizure transfer line to transfer the seizure signals to the next central recorder in sequence in the event that a particular central recorder has the recording head located in the last four minutes of the record media. Energization of the CZ relay in block 146, FIG. 9, for example, would result in the transfer of the CZ-1 points, FIG. 3, and thereby effectively transfer the seizure path to the central recorder 13.

Various other features may be supplied in the system to handle any number of situations, as desired. In summary, it is apparent that a novel arrangement has been disclosed wherein the various functions and signalling conditions required in a remotely controlled system are effected in an efficient manner with a minimum amount of hardware and with a number of lines connecting the remote station and the central recording station that is kept to a minimum. Also, since solid state components with low line current requirements are used in the control circuits, loading of the line is greatly minimized.

The principles of the invention could also be adapted to work with alternating signals and changes in impedance on the lines rather than direct current potentials and changes in resistance as disclosed herein.

The inventive arrangements disclosed herein can be readily adapted for use in a wide variety of equipment environments such as for example the data processing field, the data transmission field, telecommunications and similar fields, where a maximum amount of utility, flexibility, and system usage is required with a minimum number of interconnecting lines and circuits.

While the invention has been particularly shown and described with reference to a preferred embodiment thereof, it will be understood by those skilled in the art that additional changes in form and details other than those just described may be made therein without departing from the spirit and scope of the invention.

What is claimed is:
1. A dictating system, comprising:
a central recorder, said central recorder having a predetermined $N^x$ number of controlled elements for effecting different signalling and operating conditions in said recorder;
a dictating station, said dictating station having $N^x$ control elements that correspond in number to said predetermined number with each of said control element being associated with and provided to control a particular one of said signalling or operating controlled elements at said central recorder;
a communicating network interconnecting said central recorder and said dictating station, said network including $x$ transmission lines, and a common ground line;
means at said dictating station responsive to depression of each of said control elements at said dictating station for establishing N resistive conditions between each said signal transmission line and said ground line;
translating means interposed between said dictating station and said central recorder, said translating means including a transistor-relay combination associated with each line, each combination comprising a substantially identical circuit and each being energized in an identical number of possible N combinations in response to the resistive conditions established on said lines;
and switching means controlled by the relay portions of said transistor-relay combinations for effecting operation of each $N^x$ controlled element that corresponds to an $N^x$ control element that is actuated at said dictating station.

2. The system of claim 1 wherein $x=2$, wherein $N=3$, and wherein two sets of two transistor-relay combinations with three states each are responsive to said N line conditions to supply $N^x=9$ output control conditions.

References Cited
UNITED STATES PATENTS

| | | | |
|---|---|---|---|
| 2,765,372 | 10/1956 | Peterson | 179—100.1 |
| 2,787,659 | 4/1957 | Horwitz et al. | 179—6 |
| 2,979,568 | 4/1961 | Logan | 179—6 |
| 3,197,562 | 7/1965 | Happold et al. | 179—6 |
| 3,146,310 | 8/1964 | Jeffries et al. | 179—6 |

BERNARD KONICK, *Primary Examiner.*

R. F. CARDILLO, *Assistant Examiner.*

U.S. Cl. X.R.

179—6